Aug. 12, 1947.  T. B. GIBBS  2,425,613
TIMING APPARATUS
Filed June 28, 1941  3 Sheets-Sheet 1

Fig. 1.

INVENTOR.
Thomas B. Gibbs
BY Richardson and Auer
Attys.

Aug. 12, 1947.  T. B. GIBBS  2,425,613
TIMING APPARATUS
Filed June 28, 1941  3 Sheets-Sheet 3

INVENTOR.
Thomas B. Gibbs
BY Richardson and Quer
Attys.

Patented Aug. 12, 1947

2,425,613

UNITED STATES PATENT OFFICE 2,425,613

TIMING APPARATUS

Thomas B. Gibbs, Delavan, Wis., assignor, by mesne assignments, to George W. Borg Corporation, Chicago, Ill., a corporation of Delaware Application June 28, 1941, Serial No. 400,342

23 Claims. (Cl. 73—6)

The present invention relates in general to timing apparatus, and provides facilities which may be used for the purpose of comparing the frequencies of the outputs of any two sources of periodic electrical phenomena such as alternating current, or for comparing the output frequency of any such source with the output frequency of a standard frequency generator. In particular, the invention provides a new and improved apparatus adapted for timing watches, or similar mechanisms having periodically vibrating or oscillating parts which can be caused to produce trains of periodic impulses or alternating currents of corresponding frequency.

A feature of the invention is a timing apparatus which utilizes a differential mechanism for integrating two frequencies, one of which is taken in a negative sense, and for producing a rotary motion the speed of which is proportionate to the difference between said frequencies.

Another feature is an electrical differential which dispenses with the gears which are necessary in a mechanical differential.

Another feature is a timing apparatus which produces a graphic record showing the cumulative error in a given period of time.

Another feature is a timing apparatus which is adapted to perform automatically a large number of successive timing operations and make a graphic record of the results.

Another feature of the invention is a timing apparatus employing an indicating device which by means of a differential is subjected to the control of currents of two different frequencies, one of which may be a standard frequency, and which by the extent of its movement during a predetermined time interval indicates the difference between said frequencies.

Another feature of the invention is an arrangement for utilizing periodic impulses of a variable low frequency such as may be produced by the beating of a watch to produce correspondingly varying impulses or alternating currents of higher frequency suitable for amplification for running a motor.

The foregoing and other features of the invention will be described in detail hereinafter with reference to the accompanying drawings, in which—

Figure 1:
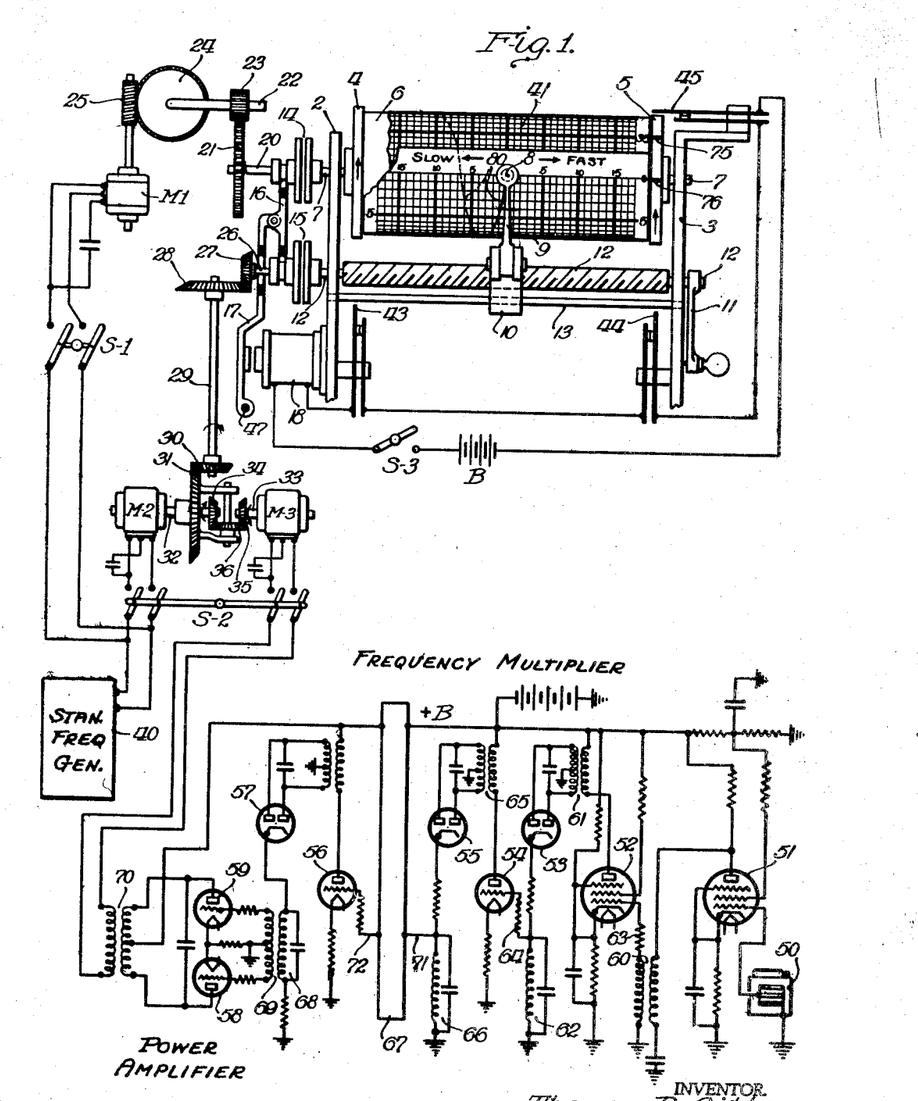
Fig. 1 is a diagrammatic representation of a complete timing apparatus, as used for timing watches.

Referring to Fig. 1 of the drawings, the graphic recorder which is here shown includes a drum or cylinder 6 which is provided with heads 4 and 5 by means of which the drum is supported on the shaft 7. This shaft is rotatable and has bearings in the frame members 2 and 3.

For the purpose of rotating the drum 6 a motor MI is provided, which may be a two-phase synchronous motor. By means of a worm 25 and gear 24 the motor MI drives the shaft 22, and shaft 22 drives shaft 20 by means of gears 23 and 21. A clutch 14 enables the shaft 20 to be coupled to the shaft 7 on which drum 6 is mounted.

The drum 6 carries a sheet of record material, which may be a ruled sheet of paper 41, as shown in the drawing. The sheet 41 is wrapped tightly around the drum 6 and is secured in any suitable manner. Several arrangements for securing a sheet of record material to a drum are well known, and accordingly it is not considered necessary to show any specific arrangement for this purpose. The overlapping ends of the sheet may in fact be secured together by an adhesive, in which case the sheet may be removed from the drum by cutting it along a line parallel to the axis of the drum.

The record material is marked by a pen or stylus 8, which may be of any suitable and well known type. The stylus 8 is secured in a holder 9 which is pivotally mounted on the carrier 10. The carrier 10 is slidable along a rod 13 supported on the frame members 2 and 3, and is moved to the right or left by means of a threaded shaft 12 which is rotatable and has bearings in frame members 2 and 3. A crank 11 enables the shaft 12 to be rotated by hand in order to properly position the stylus 8 at the beginning of a timing operation.

In the operation of the timing apparatus the threaded shaft 12 is driven from the output shaft 29 of the differential mechanism. As indicated in the drawing, the shaft 29 drives the shaft 26 by means of beveled gears 27 and 28, while shaft 26 drives shaft 12 by means of a clutch 15.

For the purpose of controlling the clutches 14 and 15 a double forked member 16 is provided, together with a magnet 18 and an armature 17 for said magnet which is pivoted at 47 at one end and is connected at the other end to the forked member 16. When the magnet 18 is energized, its armature 17 is attracted and the forked member 16 is moved to the right to cause the driving faces of the clutches to become engaged.

Figures 2, 3, 6:
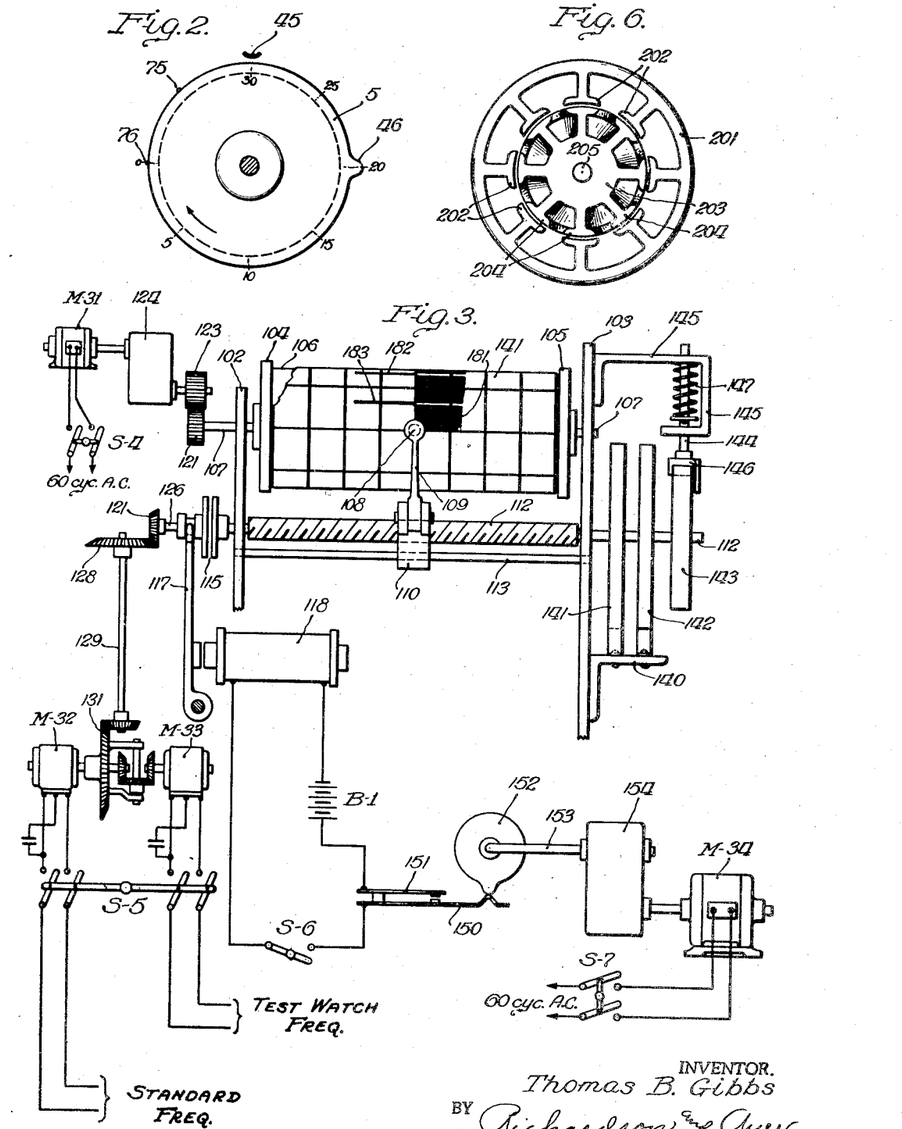
Fig. 2 is an end view of the recording drum shown in Fig. 1.
Fig. 3 shows a modification of the apparatus shown in Fig. 1, which is adapted to perform successive timing operations automatically.
Fig. 6 shows a suitable arrangement of the rotor and stator poles of the electrical differential.

The circuit of magnet 18 includes a switch S3, a battery B, representing any suitable source of current, and the movable switch contacts 43, 44, and 45. The contacts 43 and 44 are actuated by the carrier 10 in its extreme left and right hand positions, respectively, and contact 45 is actuated by a cam 46 on the drum head 5. This cam is shown in Fig. 2.

The differential mechanism includes two motors M2 and M3, which may be two-phase synchronous motors and rotate in opposite directions. The beveled gears 34 and 35 are mounted on the motor shafts 32 and 33, respectively, and are in engagement with a beveled gear 36 which is rotatably mounted in frame members secured to the gear 31. The latter gear is rotatably mounted in any suitable manner as, for example, on the shaft 32, as shown. Gear 31 drives the output shaft 29 by means of the beveled pinion 30. It will be seen that when the motors M2 and M3 run at equal speeds no rotation of gear 31 will take place, but if the motors M2 and M3 run at different speeds then gear 31 will be rotated at a speed proportionate to the difference between the motor speeds and in a direction which depends on which motor runs the faster.

Power for driving the motor M2 is supplied from a standard frequency generator, represented by the rectangle 40. This generator may be of any suitable and known type, a generator using a crystal oscillator as the constant frequency element being preferable, however. The standard frequency generator 40 may also supply the power for running the motor M1.

The motor M3 is driven from the device which is to be timed. If this device is an alternating current generator the frequency of which is supposed to be the same as the standard frequency, such generator may be connected directly to the motor M3. Usually, however, the device to be timed will require the interposition of additional apparatus in order to produce suitable alternating current for operating the motor. In the case of a watch the currents or impulses generated by the beating of the watch are of low frequency, five cycles per second, for example, and have to be converted into alternating current of a higher frequency. The conversion apparatus must not only be capable of multiplying the frequency, but must be able to operate over a range of input frequencies which is wide enough to include the beat frequencies of watches in various conditions of improper regulation such as are met with in practice.

For the foregoing purpose the frequency multiplier shown in the lower portion of Fig. 1 has been designed. This equipment will be briefly described.

The reference character 50 indicates a microphone which is used for picking up the beats of the watch being tested. A suitable microphone for this purpose is shown in Patent No. 2,175,021, granted October 3, 1939.

The space discharge device indicated at 51 may be a type 6F6G pentode and is connected as shown in the drawing. This tube functions to amplify the output of the microphone 50.

The device 52 may be another type 6F6G pentode and has its control grid coupled to the plate circuit of tube 51 by means of a transformer 60. The tube 52 functions mainly as a "noise elimi-nator" or voltage regulator, as will be explained presently.

The device 53 may be a type 6H6 full wave rectifier tube, and is connected in a circuit which includes the filter or tuned circuit 62 and the secondary windings of the transformer 61. The transformer 61 couples the plate circuit of tube 52 to the rectifier circuit.

The reference character 54 indicates an amplifier tube, which may be a type 6F8G triode. The control grid of tube 54 is coupled to the circuit of the rectifier tube 53 through a resistor 64. The plate circuit of tube 54 is coupled by means of transformer 65 to another rectifier circuit which includes the rectifier tube 55, similar to tube 53, and the tuned circuit 66. The tube 55 and associated circuits function as a frequency doubler, as will be explained.

Additional frequency doubling stages are provided, the number depending on the desired output frequency. In the present case it is assumed that the output frequency is 80 cycles per second, which requires four frequency doubling stages. One stage has been described, two additional stages are represented by the rectangle 67, and a final stage is shown to the left of the rectangle. This final stage includes the rectifier tube 57 and the amplifier tube 56. The several frequency doubling stages are alike except for the tuned circuits such as 66 and 68, which are tuned to different frequencies. Circuit 66 is tuned to 10 cycles per second, and the circuits at the intervening stages are tuned to 20 and 40 cycles per second, respectively. The tuned circuit 62 may be tuned to 5 cycles per second.

The inductive element of the tuned circuit 68 is the primary winding of a transformer 69, by means of which the final frequency doubling stage is coupled to a push-pull power amplifier comprising the tubes 58 and 59. The secondary winding of the output transformer 70 may be connected to the motor M3 by means of switch S2, which is also used for connecting the standard frequency generator to the motor M2.

The operation of the circuits and apparatus shown in Fig. 1 will now be explained. For this purpose it may be assumed that a watch to be tested is clamped to the microphone 50. In response to the beating of the watch, trains of impulses are generated by the microphone 50 and are impressed on the grid of the amplifier tube 51, where they are amplified in known manner. The plate circuit of tube 51 is coupled to the grid of tube 52 by means of the transformer 60, and trains of alternating voltages are accordingly impressed on the control grid of tube 52.

The nature of the watch beat impulses produced by the microphone 50 may be explained a little more in detail. These impulses are generated by the mechanical shocks transmitted to the microphone by the beating watch, which appear to set up trains of vibrations affecting the microphone. At any rate, each separate beat of the watch produces a train of a dozen or more impulses, and the microphone output therefore is a succession of spaced impulse trains having a frequency which is the same as the watch beat frequency. If a five-beat watch is being tested, the impulse train frequency is five trains per second.

The microphone 50 is also affected by room noises and accidental shocks, which produce stray impulses of various frequencies and magnitudes. The function of the tube 52 is to eliminate or minimize the effect of these stray impulses so that they cannot interfere with the proper operation of the equipment. For the purpose of eliminating the effects of minor noises, which produce impulses of lesser amplitude than those produced by the beating of the watch, the control grid of tube 52 is biased negatively to a point below cutoff, so that the tube normally passes no current. The negative bias is obtained by means of two resistances, connected between ground and the plus B lead, and a connection to the cathode from the junction of these resistances. This circuit arrangement maintains the cathode at a positive potential with respect to ground and since the control grid is normally at ground potential, its potential is negative with respect to that of the cathode. The adjustment of the parts is such that the trains of alternating voltages produced by the beating of a watch and impressed on the control grid of tube 52 cause the tube to pass current on the positive half-waves, whereas stray voltages of somewhat less amplitude are unable to overcome the negative bias on the control grid and produce no effect. The occasional stray impulse which may be produced by an accidental shock may be of large amplitude but is reduced to the same amplitude as the watch beat impulses by means of a rather high resistance 63 in the grid circuit. When the grid swings positive in response to watch beat impulses or stray impulses, cathode grid current starts to flow, but the current flow is limited to a very low value by the high resistance 63 and hence the grid cannot become more than very slightly positive with respect to the cathode and the plate current is limited correspondingly.

Continuing with the explanation, it will be understood, in view of the foregoing, that impulse trains having a frequency of five trains per second are set up in the plate circuit of tube 52. The impulses of each train induce alternating voltages in the secondary winding of transformer 61, which cause intermittent unidirectional current impulses to flow in the rectifier circuit. These impulses are many times higher in frequency than the watch beat frequency of five beats per second. The tuned circuit 62 is tuned to 5 cycles per second, and cannot oscillate at the higher impulse frequency, with the result that the condenser charges up while a train of impulses is flowing in the rectifier circuit and discharges during the interval between this train and the next. Thus each impulse train is converted into an alternating voltage cycle of fair wave shape, producing a five-cycle alternating voltage which is applied to the grid of tube 54.

The resulting 5-cycle impulses which are produced in the plate circuit of tube 54 induce 5-cycle alternating voltages in the secondary winding of the transformer 65. Due to the action of the rectifier tube 55, however, each half-cycle of voltage produces a uni-directional current impulse in the rectifier circuit, and in this circuit, therefore, an intermittent current is set up having a frequency of 10 impulses per second. The filter circuit 66 is tuned to 10 cycles per second and converts each impulse into an alternating voltage cycle which is applied over conductor 71 to the grid of the triode in the next frequency doubling stage.

Summing up the operations so far, it will be seen that the 5-cycle impulse trains generated by the beating of the watch have been converted to 5-cycle alternating current and that the 5-cycle alternating current has been converted to 10-cycle alternating current. Voltages due to noises which affect the microphone 50 have been eliminated at the tube 52, and at this same tube stray voltages due to accidental shocks have been reduced in amplitude to the same amplitude as that of the impulses due to beating of the watch. Such stray voltages, if any, affect the wave form of the alternating current to a degree, but their influence is progressively reduced by the action of the tuned circuits 62, 66, and similar tuned circuit in the other frequency doubling stages. The final output, therefore, has a satisfactory wave form in spite of any ordinary hazards to which the microphone may be subjected in practice.

At the next two frequency doubling stages, represented by the rectangle 67, the 10-cycle alternating voltages impressed on conductor 71 are converted to 40-cycle alternating voltages which are impressed on conductor 72, each stage operating to double the frequency of its input voltage. The frequency is doubled again at the last stage comprising tubes 56 and 57, with the result that 80-cycle alternating voltages are applied to the grids of the power amplifier tubes 58 and 59 by means of the transformer 69. The amplifier output frequency is therefore 80 cycles per second.

The output frequency is exactly 80 cycles per second only if the rate of the watch being tested is correct and it is beating at exactly five beats per second. If the watch is slow, the output frequency is less than 80 cycles per second, while if the watch is fast the output frequency will be higher than 80 cycles per second. In other words, the output frequency varies with the rate of the watch being tested and is exactly 16 times the beat frequency. The variations in beat frequency which are met with in practice are relatively small, when considered in terms of variations in output frequency in cycles per second, and the tuning of the tuned circuits such as 66 is broad enough so that the arrangement operates satisfactorily with watches in various conditions of faulty regulation. The use of the tuned circuits, however, has a tendency to produce variations in the output voltage, depending on the rate of the watch being tested, the voltage tending to be the higher the more nearly the rate of the watch being tested approximates the correct rate of exactly five beats per second. To counteract this tendency, each tube such as 54 is provided with a high resistance (on the order of 5 megohms) in its grid circuit in order to limit the extent to which the potential on the grid may rise in a positive direction and thereby limit the amplitude of the plate current variations. These tubes therefore function as voltage regulators and insure a substantially constant output voltage.

From the fact that the watch beat impulses are converted into alternating current having a frequency of 80 cycles per second, or thereabouts, depending on the accuracy of the watch being tested, it will be understood that the output frequency of the standard frequency generator 40 is likewise 80 cycles per second, assuming, of course, that motor M2 is the same at motor M3. A different frequency could be used, 40 cycles per second, for example, but this would require the use of speed changing gears or a different motor; and the preferred arrangement will usually be to employ a standard frequency which is the same as the frequency of the alternating current derived from the watch, assuming that the watch is correctly regulated.

The operator may now close the switch S1, thereby starting the motor M1. The gear ratio between the motor shaft and the shaft 20 will depend on circumstances, but in the present case it will be assumed that the gear ratio is such that when the clutch 14 is engaged the drum 6 is rotated at a speed which will cause thirty horizontal lines on sheet 41 to pass the stylus 8 per minute. Thirty lines occupy a space of 270 degrees and therefore the speed of the drum is 270 degrees per minute, or ¾ R. P. M.

At this time the operator should also note the position of the drum and the stylus and make any adjustments that are required to set the stylus to zero on the ruled sheet of record material. For this purpose the drum 6 may be freely rotated to any desired extent, since clutch 14 is not engaged, while the stylus may be moved to the right or left by turning the crank 11. The stylus is preferably lifted from the sheet 41 while the adjustments are being made.

In connection with the adjustment of the drum it may be pointed out that the sheet 41 is applied to the drum in such a manner that the zero horizontal line is in a predetermined angular position with respect to the cam 46, which functions to stop the timing operations. For the purpose of properly locating the sheet when it is placed on the drum, two marks 75 and 76 are provided on the drum head 5. The mark 76 is directly opposite the cam 46, as can be seen from Fig. 2. It will be appreciated, therefore, that if the sheet 41 is applied to the drum with the zero line opposite the mark 76, or somewhere between this mark and mark 75, the adjustment of the drum which brings the zero line beneath the stylus will automatically position the cam 46 so that the drum must rotate at least 270 degrees (equal to thirty horizontal lines) before the cam 46 engages the contact spring 45. The engagement of this spring by the cam stops the timing operation, as will be explained shortly.

Having adjusted the drum and stylus to the position shown in the drawing, the operator may now close the switch S2, thereby supplying alternating current from the standard frequency generator 40 to the motor M2 and supplying alternating current derived from the watch under test to the motor M3. The two motors accordingly start to run and very shortly attain synchronous speeds which are dependent upon the frequencies of the alternating currents with which they are supplied. If the frequencies are the same, the motors will run at the same speed and shaft 29 will not rotate, but if the frequencies are different shaft 29 will be rotated in one direction or the other, depending on which frequency is the higher.

The operator may now close the switch S3, thereby closing the circuit of magnet 18. Upon energizing, magnet 18 attracts its armature 17 and causes the clutches 14 and 15 to engage, which starts the rotation of the drum 6. If the shaft 29 is rotating, the threaded shaft 12 also starts to rotate, whereby the stylus 8 is caused to move to the right or left. The stylus accordingly draws a line on the sheet 41, which will coincide with the zero vertical line on the sheet, or which will depart from such line at a rate dependent on the rotational speeds of shafts 29 and 12 and the rate of movement of the stylus.

If the watch being tested is very poorly regulated, the shaft 12 may rotate so fast that the carrier 10 is brought into engagement with contact 43 or contact 44 before the expiration of one minute, with the result that the circuit of magnet 18 is broken, which automatically disengages the clutches 14 and 15 and stops the operation. This relieves the operator of the necessity of opening the switch S3, which he might fail to do in time, and prevents any possibility of damage to the apparatus under these circumstances.

The watch being tested will ordinarily be running accurately enough so that the timing interval of one minute will expire before the carrier 10 reaches the extremity of its movement in either direction. In the ordinary case, therefore, the timing operation will be stopped by the engagement of cam 46 with contact spring 45, which opens the circuit of magnet 18 and permits the clutches 14 and 15 to disengage.

The line which is drawn on the record sheet 41 by the stylus 8 constitutes a graphic record of the performance of the watch being tested, which indicates whether the watch is fast or slow and also enables the error, if any, to be readily calculated in seconds per day.

If the watch is slow, the motor M2 will run faster during the test period than the motor M3, and the gear 31 will be rotated in such a direction that the carrier 10 and stylus 8 are moved to the left, the stylus drawing a line on the record sheet such as the line 80. If the watch is fast, the motor M3 will run the faster, and gear 31 will be rotated in the opposite direction, whereby the carrier 10 and stylus 8 are moved to the right. In this case the line drawn by the stylus trends to the right. If the rate of the watch is correct, the motors M2 and M3 run at the same speed, the gear 31 does not rotate, and the line drawn by the stylus is parallel to the vertical lines on the record sheet.

In the case of a line which trends to the right or left, indicating that the watch is fast or slow, the size of the angle which the line makes with the vertical lines on the record sheet is a measure of the error in the rate of the watch. The horizontal and vertical lines which are printed on the sheet enable the angle, or the amount of error, to be readily interpreted in seconds per day. The manner in which this is done will be explained briefly.

It may be assumed that in the timing apparatus being described the motors M2 and M3 are 4-pole motors. Accordingly, since the motors run on 80-cycle alternating current their speed is 40 R. P. S., or 2400 R. P. M. Now if one motor gains on the other motor at the rate of 1 R. P. M., the indicated error is $\frac{1}{2400}$ minutes per minute or 36 seconds per day. Under these conditions the differential gear 31 rotates at 1 R. P. M., and accordingly one revolution of the gear 31 per minute corresponds to an error of 36 seconds per day.

Now it may be assumed that the gear ration in the coupling between gear 31 and shaft 12 is 6 to 1, and that the pitch of the threads on shaft 12 is such that for each rotation of the shaft the stylus 8 will be moved for a distance of five vertical lines. Accordingly, the stylus moves at the rate of thirty vertical lines for each revolution of the differential gear 31. One revolution of the gear per minute indicates an error of 36 seconds per day, and hence a movement of the stylus at the rate of thirty vertical lines per minute also indicates an error of 36 seconds per day. The speed of the drum, as previously mentioned, is 30 horizontal lines per minute. Hence a record line which makes an angle of 45 degrees with the vertical lines on the record sheet (a line which crosses 30 vertical lines and 30 horizontal lines)

indicates an error of 36 seconds per day. From the foregoing an equation for calculating the error indicated by any line may be derived in the form $$E = \frac{V}{H} \times 36$$

in which E represents the error in seconds per day, V the number of vertical lines crossed by the record line, and H the number of horizontal lines crossed by the record line.

Applying the above equation to typical record lines, it will be seen that a line which crosses ten vertical lines and thirty horizontal lines indicates an error of 12 seconds per day, a line which crosses one vertical line in thirty horizontal lines indicates an error of 1.2 seconds per day, while a line which crosses fifteen vertical lines in ten horizontal lines indicates an error of 54 seconds per day.

It will be understood that the constant 36 is dependent upon the assumed values and that other values might be used, which would change the constant. The specific assumptions have been made with a view to facilitating a clear understanding of the principles upon which the operation depends.

Having noted that the timing operation has stopped, the operator may now stop the motors M2 and M3 by opening the switch S2. Switch S3 is also opened. Assuming that a line such as 80 has been drawn by the stylus, the operator is advised that the watch under test is slow and can readily determine the amount of the error in the manner explained. The watch may now be removed from the microphone and adjusted for a faster rate, after which it may be replaced and the timing operation may be repeated. Before the switches S2 and S3 are closed to start the second test the stylus is, of course, set to zero again in the manner previously described. The record line drawn in the second timing operation may show that further adjustment is required, and the adjustment and timing is continued until the watch is properly regulated.

It may be pointed out that a single sheet of record material may be used for a considerable number of timing operations when regulating watches as described in the foregoing. The record lines will rarely coincide, and it will also be clear that the stylus does not have to be set at zero each time. Various other starting points, such as 5 vertical 0 horizontal, for example, may be selected, and the record sheet may be fairly well covered with record lines before it has to be removed and replaced with another sheet.

Reference will now be made to Fig. 3, and the modification there shown will be described.

This modification may have various uses, but as disclosed herein it is especially designed for performing repeated timing operations on a watch over an extended period, such as 24 hours, for example. It is not usually necessary or desirable to do this, but watches are occasionally met with which do not keep good time although they appear to be properly regulated when tested. Such poor time-keeping quality may be due to various causes, for example, to an exceptional variation in rate depending on the tension in the mainspring, which would cause the rate to be greatly affected by irregular winding. Again, the rate may be subject to periodic slowdown, due to an imperfect tooth in one of the gears of the gear train, or to particles of dirt in the gears. Such defects are not readily perceived when a watch is tested once or twice for regulating purposes, but will show up on a continuous test over a period of 24 hours.

The apparatus employed is generally similar to that shown in Fig. 1. The drum 106 is provided with heads 104 and 105 by means of which it is supported on the shaft 107, the latter being rotatable in bearings in the frame members 102 and 103. A record sheet 141 is carried on the drum 106.

The drum 106 is rotated by means of a motor M31, which may be any suitable type of small alternating current motor. The motor shaft is connected to shaft 107 through gears 123 and 121 and by suitable reducing gears which are enclosed within the housing 124. The gear ratio is such that the drum makes one complete rotation every 24 hours.

The stylus 108, holder 109, and carrier 110 may be the same as the corresponding parts in Fig. 1. The carrier is slidable on rod 113, by means of the threaded shaft 112. The shaft 112 is driven by a differential mechanism which includes the two motors M32 and M33, operating on current from a standard frequency generator and on current generated by the test watch, respectively. This portion of the equipment also may be the same as shown in Fig. 1.

The clutch 115, by means of which the threaded shaft 112 is connected to the differential mechanism, is operated by a magnet 118 and armature 117. The magnet circuit includes a switch S6 and a pair of contacts 150 and 151. The contact 150 is controlled by a cam 152, which is mounted on shaft 153 and is driven by a motor M34 through the medium of a set of reduction gears contained in the housing 154. The gear ratio is such that the cam 152 rotates slowly at the desired test frequency. A speed of 1 R. P. M. is suitable for the purpose.

The shaft 112 extends to the right beyond the frame member 103, where two helical springs 141 and 142 are provided. These springs may be similar to clock springs. The inside ends of both springs are secured to the extension of shaft 112, and the outside ends are secured to the bracket 140. The springs are wound in opposite directions and are normally under tension, the adjustment being such that the rotative forces exerted by the springs balance each other when the carrier 10 is in the position in which it is shown in the drawing. The springs function to restore the carrier 110 and stylus 108 to normal position.

At the end of the extension of shaft 112 there is mounted a disk 143, which has a V-shaped notch in its periphery. Associated with this disk there is a rod 144 which is vertically slidable in the bracket 145 and which carries a wedge-shaped head 146. The rod 144 is pressed downwardly by the spring 147, and the wedge-shaped head 146 is therefore maintained in engagement with the periphery of disk 143, entering the notch in said disk when it reaches approximately the angular position in which it is shown in the drawing. The disk 143 and associated parts constitute a centering device which insures that the stylus is restored to the same position each time.

The operation of the modification, Fig. 3, will now be described. The watch to be tested is clamped to the microphone and causes the latter to generate trains of impulses which are converted to 80-cycle alternating current, all as described in connection with Fig. 1. This part of the apparatus being in order, the operator will close switches S4 and S7 to start motors M31 and M34. Motor M31 drives the drum 106 at a speed of one rotation per day, as previously mentioned. Motor M34 rotates the cam 152 at a speed of 1 R. P. M., whereby the contact spring 150 is momentarily separated from contact spring 151 once each minute. The operator also closes switch S5, whereby the standard frequency alternating current and the alternating current generated by the watch being tested are supplied to motors M32 and M33, respectively. These motors accordingly start to run and the gear 131 of the differential is rotated or not, depending on whether or not the motors run at different speeds. This equipment is the same as the corresponding equipment in Fig. 1, and hence its operation need not be again considered in detail.

The switch S6 may now be closed. If the cam 152 is in the position in which it is shown in the drawing, the circuit of magnet 118 will not be closed, but as soon as the cam disengages the contact spring 150 the spring engages contact spring 151 and the magnet circuit is completed. Upon energizing, magnet 118 attracts its armature 117, thereby engaging clutch 115, whereby the differential mechanism is coupled to the threaded shaft 112. The apparatus is now in operation.

Assuming that the watch being tested is somewhat fast or slow, the output shaft 129 of the differential mechanism is rotated at a proportional speed and drives the threaded shaft 112 through the medium of gears 128 and 121 and clutch 115. The stylus 108 is accordingly moved to the right or left, drawing a line on the record sheet 141. Since the drum 106 is rotating at a very slow speed, the line is substantially parallel to the axis of the drum. The length of the line is an indication of the amount of the error in the rate of the watch.

At the expiration of one minute the cam 152 engages the contact spring 150 and breaks the circuit of magnet 118, whereupon the magnet deenergizes and releases clutch 115. The shaft 112 now restores under the influence of one of the springs 141 or 142, returning the carrier 110 and the stylus 108 to their original position. In this connection it will be understood that during the timing period, when shaft 112 is rotated by the differential mechanism, one of the springs 141 and 142 will be wound up further while the other spring will be unwound, thereby increasing the tension in one spring and decreasing the tension in the other. When the clutch is released, therefore, the spring having the greatest tension will restore the shaft 112, as stated. As the stylus 108 reaches approximately its normal position, the wedge-shaped head on the rod 144 enters the notch in disk 143, which prevents any oscillation that might otherwise occur and exactly positions the stylus at the proper starting point for the next test.

The cam 152 holds the circuit of magnet 118 open for several seconds, which is ample time for the restoration of the stylus. The circuit of magnet 118 is then closed again, the differential mechanism is again coupled to the shaft 112, and the timing operation is repeated. The equipment continues to operate in this manner as long as the switches remain closed. Preferably the timing is permitted to go on for 24 hours, or until the drum 106 has made a complete rotation, which results in a complete record of the performance of the watch during one winding period.

The drawing, Fig. 3, shows the drum 106 in the position which it assumes after having made part of a rotation. It will be observed that the lines traced by the stylus are very close together. The stylus makes two lines per minute, one drawn slowly during the timing period and the other drawn on the return, or a total of 2880 lines in 24 hours. If the circumference of the drum is 9 inches, there will be 320 lines per inch and the lines will be so close that they will overlap and completely cover the area of the record sheet which they traverse. This is entirely satisfactory for most purposes, for the outline of the covered area is the significant part of the record. In case it is desired to have the record lines separate and distinct, a larger drum can be used; or the cam 152 can be arranged so as to space out the timing periods. For example, two-thirds of the cam surface may be raised and the remaining one-third may be depressed and the cam may be rotated at a speed of one rotation every three minutes. With this arrangement the timing periods would be spaced two minutes apart.

The partial record shown on the sheet 141 in Fig. 3 indicates that the watch is running somewhat fast, and the sloping margin 181 indicates that the rate is slowly decreasing. This decrease in the rate may be attributed to the loss of tension in the mainspring as the watch runs down. At 182 the record indicates an abrupt and rather large decrease in the rate, which is repeated at 183. It may be assumed that these periodical changes in rate are due to some mechanical defect such as mentioned hereinbefore.

Figures 4, 5:
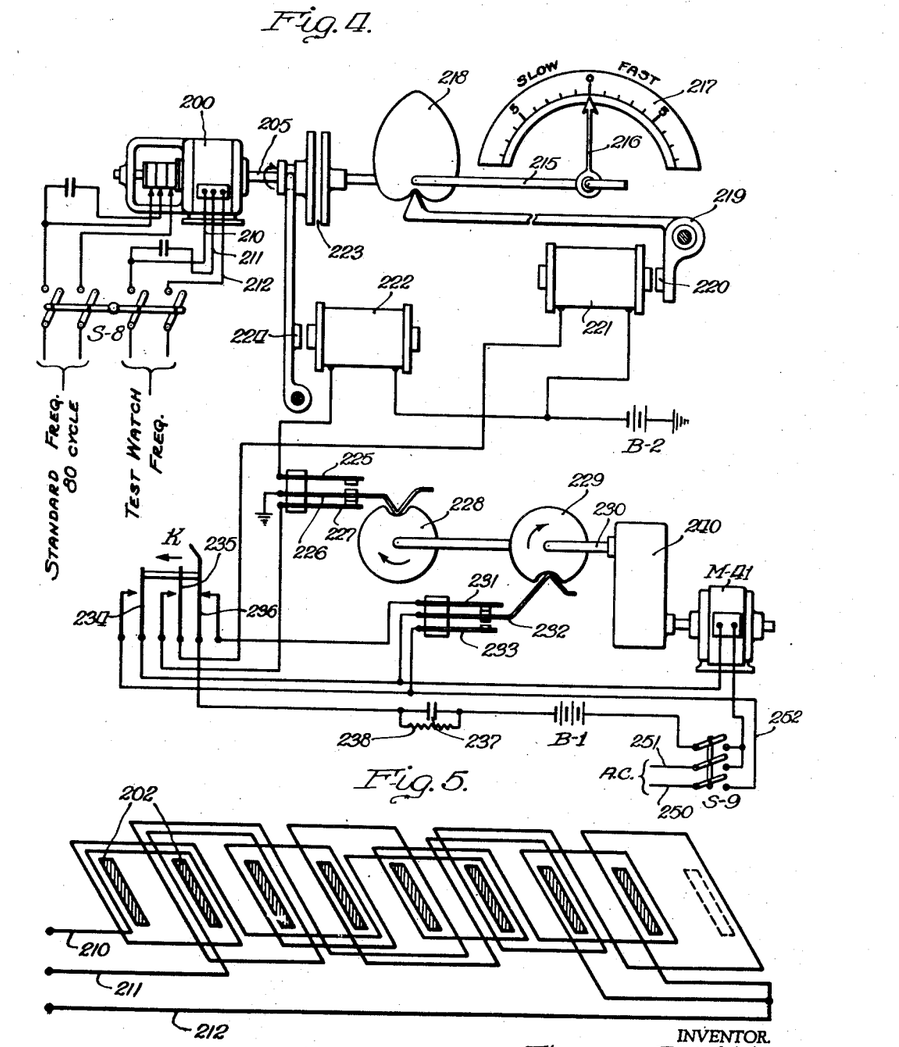
Fig. 4 shows a further modification, employing an electrical differential and a mechanical indicating device.
Fig. 5 shows a suitable winding arrangement for use in the electrical differential.

Reference may now be made to Fig. 4 for the purpose of describing the modified form of timing apparatus there shown.

The electrical differential which is employed instead of the mechanical differential used in the other modifications will first be described. The electrical differential is indicated at 200 in Fig. 4, which also shows the circuit connections and a switch S8 by means of which the alternating currents of standard frequency and test watch frequency are supplied to the windings of the differential.

The electrical differential includes a stator and a rotor, the construction of which is diagrammatically illustrated in Fig. 6. As here shown, the stator 201 has eight poles such as 202, the faces of which are parallel to the shaft 205. The stator may therefore be similar to the stator of a known type of two-phase synchronous motor. The rotor 203 also has eight poles such as 204, and while the pole faces may be parallel to the shaft, they are preferably made to extend spirally of the shaft, the angular displacement from one end of each pole to the other end being approximately equal to the spacing between poles. This construction promotes a uniform and continuous movement of the rotor when the device is in operation. The shaft 205, on which the rotor is mounted, is provided with suitable bearings in end plates secured to the stator, as is customary in motor construction.

The stator winding is shown diagrammatically in Fig. 5, where the reference characters 210 and 211 indicate the conductors of the two phases, respectively, while the reference character 212 indicates the common return conductor. It will be seen that the winding for the first phase is essentially a four-pole winding, since each coil surrounds two physical poles of the eight-pole stator. The second phase winding is also a four-pole winding and overlaps the first phase winding by one-half electrical pole, or one physical pole.

The rotor winding is the same as the stator winding. However, slip rings and brushes are provided for connecting the external supply conductors to the rotor winding, as indicated in Fig. 4.

The stator and rotor windings are so connected that the stator and rotor fields both rotate in the same direction. It may be assumed that the direction is clockwise, as the differential is seen in Fig. 6, or from the right in Fig. 4. When the switch S8 is closed and alternating currents are supplied to the rotor and stator, there may be a momentary torque applied to the rotor, if its poles are out of alignment with those of the stator, but as soon as the poles are brought to alignment the torque falls to zero and rotation ceases unless the rotor and stator fields rotate at different speeds. In other words, if the frequency of the alternating current supplied to the stator is the same as the frequency of the alternating current supplied to the rotor, no torque is produced and the rotor stands still. This will be clear from the fact that the fields are rotating in the same direction. If it be assumed now that the stator field rotates faster than the rotor field, a torque will be produced which will cause the rotor to rotate in a clockwise direction, or in the same direction as that in which the fields are rotating. The rotor speed is proportional to the difference in the speeds of the two fields. For example, if the stator field gains on the rotor field at the rate of one rotation per minute, the speed of the rotor will be 1 R. P. M. If it be assumed, on the other hand, that the rotor field has the higher speed, a similar condition will exist; that is, a torque will be applied to the rotor, but in this case the rotor will be caused to rotate in a counter-clockwise direction.

From the foregoing it will be seen that the rotor of the differential is driven at a speed which depends on the difference between the speeds of the rotor and stator fields and in a direction which depends on which speed is the higher. Assuming clockwise rotation of the fields as the differential is viewed from the right in Fig. 4, the shaft 205 will be rotated in the direction of the arrow if the test watch frequency is higher than the standard frequency and will rotate in the opposite direction if the conditions are reversed.

The indicating device comprises a shaft 215, carrying a pointer 216 which cooperates with the scale 217. The shaft 215 also has a heart-shaped restoring cam 218, which is actuated by means of a bell crank lever 219. The lever carries the armature 220 of the restoring magnet 221.

The differential shaft 205 may be connected to the indicator shaft 215 by means of a clutch 223, the engagement and release of which are controlled by the magnet 222.

The reference character M41 indicates a small motor which may be of any suitable alternating current type. This motor drives a cam shaft 230 by means of a set of reduction gears enclosed in the housing 240. The gear ratio may be such that shaft 230 makes one rotation per minute. The circuits of magnets 221 and 222 and the motor circuit are controlled by a key K and two cams 228 and 229.

The operation of the timing equipment shown in Fig. 4 will now be explained. The watch to be tested is clamped to the microphone and causes alternating current having a frequency of approximately 80 cycles per second to be generated, the same as described in connection with the two previous modifications. An 80-cycle standard frequency generator may also be used.

When the operator closes the switch S8, the standard frequency alternating current and the alternating current generated by the watch being tested are supplied to the electrical differential 200, and the differential operates as previously described. The switch S9 is also closed at this time, preparing a circuit for motor M41 over the alternating current supply conductors 250 and 251. Switch S9 also closes a circuit over which the condenser 237 and the battery B1 are connected in series with the motor M41. This is a braking circuit the function of which will be described shortly.

The operator may now actuate the key K to start the timing operation. At contact spring 236 of the key the braking circuit above referred to is opened. At contact spring 235 a circuit for the restoring magnet 221 is closed, said circuit extending from ground by way of contact springs 226 and 227, contact 235 of the key, and winding of magnet 221 to the grounded battery B2. Upon energizing, magnet 221 attracts its armature 220 and actuates the lever 219, restoring the indicator 216 to zero position, if it is in some other position. The drawing, however, shows the indicator at normal. Finally, at contact spring 234 the key closes a circuit for motor M41, which extends from the alternating current supply conductor 250 by way of a contact of switch S9, conductor 252, contact 234, motor M41, and another contact of switch S9 to the alternating current supply conductor 251. Upon the closure of this circuit the motor M41 starts to run and begins to rotate the cam shaft 230.

Cam 229 now opens the braking circuit by moving contact spring 232 away from contact spring 231, and places a shunt around contact 234 of the key by bringing said spring 232 into engagement with contact spring 233. This latter operation closes the motor circuit independent of the key K, which may now be restored.

Cam 228 is also rotated by motor M41 and opens the circuit of the restoring magnet 221 by separating contact springs 226 and 227, shortly afterward closing the circuit of the clutch control magnet 222 by bringing contact spring 226 into engagement with contact spring 225. Upon energizing, magnet 222 attracts its armature 224 and thus operates the clutch 223, whereby the shaft 205 of the electrical differential 200 is coupled to the indicator shaft 215.

The operation now depends on the rate of the watch being tested. If the rate is correct, no rotation of the differential shaft 205 will take place, and the indicator shaft 215 will remain stationary. If the watch is fast, the differential shaft will rotate in a clockwise direction and the indicator shaft 215 will rotate with it, moving the pointer 216 to the right over the scale 217. If the watch is slow, the differential shaft will rotate in a counter-clockwise direction, moving the pointer 216 to the left.

At the end of one minute the cams 228 and 229 complete one rotation and resume the positions in which they are shown in the drawing. Cam 228 opens the circuit of magnet 222 at contact springs 225 and 226 and prepares a circuit for the restoring magnet 221 at contact springs 226 and 227. Upon the deenergization of magnet 222, the clutch 223 is released and shaft 205 is disconnected from shaft 215. Cam 229 opens the circuit of motor M41 at contact springs 232 and 233, and at contact springs 231 and 232 closes the braking circuit for the motor, the latter circuit being traceable from the left hand pole of battery B1 by way of condenser 237, contact 236 of key K, contact springs 231 and 232, winding of motor M41, and upper contact of switch S9 to the right hand pole of battery B1. Upon the closure of the braking circuit the condenser 237, which has discharged through resistance 238, charges again and a momentary heavy current flow is established which brings the motor M41 to a stop. The condenser should be of sufficient capacity to stop the motor without appreciable over-run. After the condenser has been charged some current will continue to flow through resistance 238, but the resistance is high enough to prevent excessive drain on the battery or heating of the motor. The braking circuit is opened at switch S9 when operations are discontinued.

It will be noted that the timing operation is stopped automatically at the expiration of one minute. The indicator pointer 216 is left standing in the position reached at the moment the timing operation is terminated, and its position therefore indicates whether the rate of the watch is correct or not, and if not, how much it is fast or slow, the scale 217 being preferably calibrated in seconds per day. As shown herein, the scale is only 180 degrees in length, or 90 degrees for each direction of motion of the pointer 216. However, it will be clear that the scale may encompass a full circle if desired. Moreover, a pair of speed reducing gears may be introduced at some point between the differential and the indicator in order to reduce the travel of the pointer for a given extent of rotation of the differential and thereby bring indications of greater errors in rate within the scope of the scale.

Assuming that the rate of the watch is incorrect, the operator will make the necessary adjustment, return the watch to the microphone, and then re-operate the key K momentarily to restore the indicator and start another timing operation. The second timing operation is carried out as described in the case of the first, and may be repeated if necessary. When the operations are concluded the switches S8 and S9 may be opened.

It will be understood that the electrical differential shown in Fig. 4 may be used in place of the mechanical differentials which are shown in Figs. 1 and 3, and that a mechanical differential can be used in Fig. 4, if desired.

The invention having been described, that which is believed to be new and for which the protection of Letters Patent is desired will be pointed out in the appended claims.

I claim:

1. In a graphic timing apparatus, a drum having a sheet of record material thereon, means for rotating said drum, a marking stylus movable parallel to the axis of said drum, a differential mechanism supplied with alternating currents of two different frequencies, and means for causing said mechanism to produce a continuous motion of said stylus in one direction or the other along said axis depending on which frequency is the higher and at a rate which depends on the difference between said frequencies.

2. In a timing apparatus for comparing the frequencies of two alternating currents, a rotatable member, means including a differential drive mechanism responsive to said currents for continuously rotating said member at a speed which is proportionate to the difference between said frequencies, record material and means for moving it, a stylus for marking said material, and means operated by rotation of said member for moving said stylus in a direction across the direction of motion of said material, whereby a graphic record is made of the difference between said frequencies.

3. In a timing apparatus for comparing the frequencies of two alternating currents, a rotatable member, means including a differential drive mechanism responsive to said currents for rotating said member at a speed proportionate to the difference between said frequencies, record material, means for moving said material at a constant speed and for a predetermined time interval, a stylus for marking said material while the same is moving, and means operated by rotation of said member for moving said stylus in a direction transverse to the direction of motion of said material, whereby a line is drawn on said material by said stylus which indicates the accumulated frequency difference throughout said time interval.

4. In a graphic timing apparatus, record material and means for moving it, a stylus for marking said material responsive to motion thereof, means controlled by a device being timed for moving said stylus at a speed dependent on the error in the rate of said device, means for starting the motion of said material and said stylus, and means responsive to a predetermined extent of motion of said material or of said stylus, whichever occurs first, for automatically stopping the motion of both.

5. In a watch timer, a sheet of record material, means for moving said sheet at predetermined speed, a stylus for marking said sheet, means responsive to the beating of a watch being tested for generating periodic currents, means comprising a differential mechanism for comparing the frequency of said currents with a standard frequency, and means controlled by said comparing means for uninterruptedly moving said stylus in a direction transverse to the direction of motion of said sheet and at a speed which depends on the difference between said frequencies.

6. In a graphic timing apparatus, record material, means for moving said material at a slow speed, a stylus for marking said material responsive to motion thereof, a member rotated at a speed dependent on the error in the rate of a device being timed, auxiliary timing means for causing said member to move said stylus at uniformly spaced intervals, and means for automatically restoring said stylus between adjacent intervals.

7. In a graphic timing apparatus, a rotatable member, a differential mechanism controlled jointly by the device being timed and a standard device to rotate said member at a speed dependent upon the error in the rate of the device being timed, record material, a stylus for marking said material, means including a threaded shaft for moving said stylus with respect to said material, means including a clutch for coupling said member to said shaft, means including a timing device for periodically controlling said clutch to uncouple said member and shaft, means for automatically driving said threaded shaft in a reverse direction to restore said stylus each time uncoupling is effected, and means for moving said record material to cause successive marks made by said stylus thereon to occupy different positions.

8. In a graphic timing apparatus, the combination, with record material and means for moving it, of a marking device, means supporting said marking device for movement in either direction across the direction of movement of the record material, a differential mechanism jointly controlled by the apparatus being timed and a standard for moving said marking device at a speed depending on the error in the rate of the apparatus being timed and in a direction depending on whether said apparatus is fast or slow with respect to said standard, means operating automatically at equally spaced intervals for rendering said marking device non-responsive to said mechanism, and means effective in each such interval for restoring said marking device.

9. In a graphic timing apparatus, record material, a device for marking said material, a differential mechanism jointly controlled by the device being timed and a standard with which it is being compared for moving said marking device to draw lines on said record material in either of two directions depending on whether the rate of the device being timed is fast or slow with respect to the said standard, means for periodically restoring said marking device to its starting position, and means for moving said record material to cause each line to occupy a different position thereon.

10. In a timing apparatus, mechanism for testing a device to be timed to compare the rate thereof with a standard rate, means for automatically and repeatedly operating said mechanism to perform a succession of tests extending for equal predetermined time intervals, and means controlled by said mechanism for making graphic records of said tests showing the extent and direction of the error found on each test.

11. In a timing apparatus, mechanism for testing a device to be timed to compare the rate thereof with a standard rate, means for automatically and repeatedly operating said mechanism to perform a succession of tests extending for equal predetermined time intervals, record material, and means controlled by said mechanism during the performance of each test for drawing a line on said record material which indicates by its length the difference between the rate of said device and the standard rate and by its direction whether the rate of said device is faster or slower than the standard rate.

12. In a timing apparatus, mechanism for testing a device to be timed to compare the rate thereof with a standard rate, means for automatically and repeatedly operating said mechanism to perform a succession of tests extending for equal predetermined time intervals, record material, a marking device controlled by said mechanism during each test to draw a line on said material indicative of the extent and direction of the error found, and means for moving said record material at a slow speed such that said lines produce a shaded area thereon.

13. In a timing apparatus, record material, a device for marking said material, means for moving said device including a shaft which is rotated periodically responsive to successive timing operations, the direction of rotation depending on the result of such timing operations, and two restoring springs connected to said shaft, one or the other of which is tensioned on each rotation of the shaft to effect restoration thereof.

14. In a timing apparatus, record material, a device for marking said material, means for moving said device including a rotatable shaft, restoring means for said shaft comprising two helical springs connected thereto and equally tensioned in opposite directions, means responsive to a timing operation for rotating said shaft in one direction or the other depending on whether the device being timed is fast or slow, said rotation being effective to increase the tension in one spring and decrease the tension in the other spring, and means effective at the end of a timing operation for placing the shaft under control of said springs, whereby it is restored by the spring having the greatest tension.

15. Timing apparatus as claimed in claim 14, wherein auxiliary restoring mechanism is provided which is operative on the shaft when the tension in said springs becomes substantially equal.

16. In a graphic timing apparatus, record material, a drum for moving said material, a motor for rotating said drum, a device for marking said record material, means including a rotatable shaft for moving said device, a differential mechanism controlled jointly by an apparatus being timed and a standard apparatus for rotating said shaft, means for coupling said motor to said drum and for simultaneously coupling said differential mechanism to said shaft, and means effective automatically upon the expiration of a predetermined time interval for releasing said couplings.

17. In a graphic timing apparatus, record material and means for moving it, means for starting the movement of said material, a marking device for drawing a line on said material responsive to movement thereof, a differential mechanism controlled by a device being timed and a standard device to move said marking device and thereby control the direction of said line, means for stopping the movement of said material and the movement of said marking device after a predetermined time interval, and means for stopping said movements in the event that the line drawn by said marking device diverges a predetermined amount before the expiration of said time interval.

18. In a timing apparatus for checking the rate of a watch or the like, to detect random rate variations which may occur during the period between successive windings, means for comparing the rate of a watch with a standard rate for a predetermined short time interval to determine if the watch is fast or slow and the amount of the error, if any, means for automatically repeating the test of said watch at predetermined intervals throughout the said period, record material, a marking device, and means responsive to each test for actuating said marking device to record the result of the test on said material.

19. In a graphic timing apparatus, movable record material having spaced lines thereon parallel to its direction of movement, a marking device movable at right angles to said lines, means including a differential mechanism jointly controlled by the apparatus being timed and a standard apparatus for moving said marking device for a predetermined time and at a speed proportionate to the error in the rate of the apparatus being timed, and means for moving said record material at a predetermined speed having such a relation to the marking device speeds which result from errors within a selected range that the corresponding lines drawn by the marking device will make readily readable angles with said spaced lines on the record material.

20. Graphic timing apparatus as claimed in claim 19, wherein the speeds are so related that in timing an apparatus having an error falling in or near the center of the selected range the line drawn by the marking device will make an angle of forty-five degrees with any of the spaced lines on the record material which it intersects.

21. A timing apparatus for comparing the frequencies of two alternating currents, comprising record material, means for moving said material for a predetermined time interval, a marking device adapted to draw a line on said record material responsive to movement thereof, a differential mechanism responsive to said currents, and means including gears or the equivalent for causing said mechanism to move said marking device and thereby cause the line drawn thereby to make an angle with the longitudinal axis of said record material which is proportionate to the difference between said frequencies, the gear ratio being so related to a selected maximum frequency difference that the line drawn by the marking device will be confined to a predetermined area of said record material throughout said predetermined time interval.

22. In a timing apparatus for comparing an unknown frequency with a standard frequency, record material and means for moving it at a predetermined speed, a marking device for making a record line on said material responsive to movement thereof, means including a differential mechanism for moving said device at a speed proportionate to the difference between said frequencies and thereby control the direction of said record line, a plurality of transverse lines on said material adapted to be intersected by said record line and having a uniform spacing bearing a predetermined relation to the speed of the material, and a plurality of longitudinal lines on said material also adapted to be intersected by said record line and having a uniform spacing bearing a predetermined relation to a marking device speed which results from a particular selected difference in frequencies.

23. A timing apparatus as claimed in claim 22, adapted for timing watches or the like, wherein means is provided for moving the record material and marking device for a predetermined time interval to time a watch, and wherein the various speeds and line spacings are so related that the number of transverse and longitudinal lines crossed by the record line during said time interval may be used to calculate the error of the watch in seconds per day.

THOMAS B. GIBBS.

REFERENCES CITED

The following references are of record in the file of this patent:

UNITED STATES PATENTS

| Number | Name | Date |
|---|---|---|
| 2,035,759 | Poole | Mar. 31, 1936 |
| 2,235,317 | Gibbs | Mar. 18, 1941 |
| 2,038,059 | Reichel | Apr. 21, 1936 |
| 2,113,825 | Caldwall | Apr. 12, 1938 |
| 2,188,059 | Norrman | Jan. 23, 1940 |
| 775,535 | Meissner | Nov. 22, 1904 |
| 1,566,879 | Karapetoff | Dec. 22, 1925 |
| 1,641,693 | Price et al. | Sept. 6, 1927 |
| 1,827,187 | Brown et al. | Oct. 13, 1931 |
| 1,769,988 | Davis | July 8, 1930 |
| 1,967,072 | Young | July 17, 1934 |
| 1,544,989 | James | July 7, 1925 |
| 2,036,444 | Tolson | Apr. 7, 1936 |
| 1,500,860 | Yo | July 8, 1924 |
| 1,881,011 | Wittkuhns | Oct. 4, 1932 |
| 1,111,345 | Wood | Sept. 22, 1914 |

FOREIGN PATENTS

| Number | Country | Date |
|---|---|---|
| 326,436 | Germany | Sept. 29, 1920 |
| 450,864 | England | July 24, 1936 |